March 21, 1967 G. D. KNEIP, JR 3,310,398
ELECTRICAL MATERIALS AND DEVICES
Filed Aug. 14, 1964
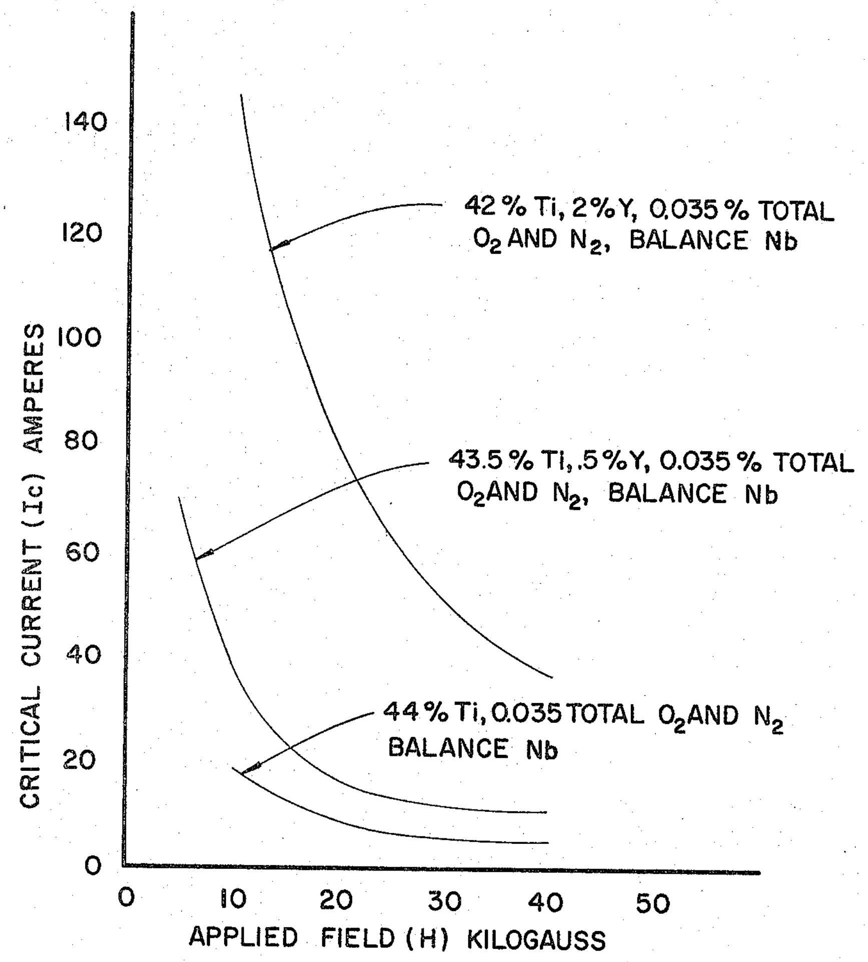

United States Patent Office 3,310,398
Patented Mar. 21, 1967

3,310,398

ELECTRICAL MATERIALS AND DEVICES

George D. Kneip, Jr., Houston, Tex., assignor to National Research Corporation, Cambridge, Mass., a corporation of Massachusetts Filed Aug. 14, 1964, Ser. No. 389,686
2 Claims. (Cl. 75—134)

This invention relates to alloys and more particularly to superconducting alloy compositions and to devices utilizing alloys as the active superconducting medium.

Accordingly, a principal object of the present invention is to provide alloys which possess good super-conducting properties as well as good workability and ductility.

Another object of the present invention is to provide certain superconducting, workable ternary alloys comprising niobium, titanium and yttrium.

Still another object of the invention is to provide superconducting devices such as, for example, superconducting magnets utilizing the above alloys.

Other objects of the invention will be obvious and will in part appear hereinafter.

For a fuller understanding of the nature and objects of the invention reference should be had to the following detailed description taken in connection with the accompanying drawing which illustrates curves showing the critical current versus applied magnetic field for 10 mil wire of certain niobium-titanium containing alloys when tested with the wire axis and hence the current perpendicular to the applied field at 4.2° K.

In recent years considerable effort has been directed to the development of superconducting materials and the use thereof in various devices such as, for example, superconducting solenoids. Most contemplated uses of superconducting materials require the flow of large currents, and many require the creation of a magnetic field of some magnitude. Moreover most of the contemplated superconducting devices require the use of superconducting material in the form of a fine wire or ribbon. For example, the superconducting wire may be of a diameter of about 15 mils or less. In such devices, the wire or ribbon may take the form of single or multiple straight strands, or for many magnetic applications may be wound to assume the form of one or more coils, as in a solenoid.

Many of the heretofore proposed superconducting materials while possessing very desirable superconducting properties are quite brittle and/or unworkable by ordinary fabricating techniques and thus do not lend themselves to such physical operations as wire drawing, winding and the like. Likewise, many of the heretofore proposed materials while possessing the desired physical properties for permitting such operations as wire drawing, winding, etc., have only fair or poor superconducting properties. In the present invention, there are provided alloys which possess good superconducting properties as well as good workability and ductility.

The superconducting alloy compositions of the present invention comprise, by weight, from about 30 to about 60% titanium, from about 0.5 to about 2.0% yttrium, from about 0.005 to about 0.05% oxygen, from about 0.005 to about 0.05% nitrogen, and the balance niobium. Ingots, bars or rods, of the above alloys although possessing substantial amounts of interstitial elements, oxygen and nitrogen, can be readily fabricated into fine, ductile superconducting wire.

Briefly, the alloys of this invention can be prepared according to conventional techniques. For example, the alloying elements or ingredients can be homogeneously consolidated in a cold mold by utilizing arc melting, electron beam melting, or induction melting methods or by employing skull melting and casting techniques or the like. The ingot produced from the melt or a rod or bar obtained from the ingot can be worked or reduced to a diameter at which it can then be cold drawn in a series of steps to a wire of the desired diameter. The initial reduction or working can be accomplished by, for example, swaging, rolling, extruding or the like. After this initial working which is preferably a predominantly cold-reduction operation, the resulting wire is then cold drawn in an increment of several steps, each step reducing the diameter until the final desired diameter is achieved.

The wire can be coated with a suitable thickness of copper, for example, about 1.0 mil on radius, by known electroplating techniques and then provided with a coating of a suitable electrical insulating material. Exemplary of the insulating materials utilized on superconducting wires are the organic plastic materials, such as polyamides (nylon), fluorocarbon resins, e.g., tetrafluoroethylene resins and the like, epoxys, etc. If desired, a plurality of the copper coated wires can be stranded together and then encased in a suitable organic plastic material.

When the insulated wire or cable is to be utilized in, for example, a superconducting solenoid, it can be wound into by a coil by conventional techniques.

The following non-limiting example illustrates one method for the preparation of alloys of the following compositions and the testing of the current carrying capacities of wire samples thereof:

(a) 44% titanium, 0.03% oxygen, 0.005% nitrogen, balance niobium
(b) 43.5% titanium, 0.5% yttrium, 0.03% oxygen, 0.005% nitrogen, balance niobium
(c) 42% titanium, 2.0% yttrium, 0.03% oxygen, 0.005% nitrogen, balance niobium

EXAMPLE

The proper amounts of alloying elements which in total contained approximately the preferred sum total of oxygen and nitrogen, that is, between about 0.01 and 0.1% were consolidated together by arc melting on a water cooled copper hearth. The resulting alloy buttons were remelted a plurality of times in order to promote homogeneity. After the last remelting, the melt was poured into a copper water cooled mold to form an ingot about 3 inches long and about ½ inch in diameter. The oxygen content of the alloy was about 0.03% (300 p.p.m.) and the nitrogen content was about 0.005% (50 p.p.m.), the sum total being about 0.035%.

The ingot was scalped, canned in a mild steel tube and swaged in a succession of steps to a diameter of about 130 mils. The steel can was pickled off from the resulting alloy wire with a nitric acid-water solution. The wire was then etched with a solution comprising nitric acid, hydrofluoric acid and water. After the etch the surface of the wire was oxidized and then coated with a drawing lubricant. The coated wire was cold drawn in a succession of steps to a diameter of about 10.3 mils and then passed through an alkaline detergent bath and an acid pickle bath comprising, nitric acid, hydrofluoric acid, sulfuric acid and water to remove contaminants such as oxides and lubricating compositions therefrom. The final diameter of the wire was about 10 mils.

A sample of wire of about 9 inches in length was mounted in hairpin fashion on a suitable holder. The ends of the alloy wire sample were indium tinned and attached to copper leads. The mounted sample was immersed in liquid helium at atmospheric pressure (4.2° K.) and inserted axially into the center of a solenoid. The liquid helium temperature of 4.2° K. was well below the critical or transition temperature of the alloy. After an adequate cooling period to assure all parts of the sample to be at liquid helium temperature, the magnetic field level was set and the current in the sample increased approximately linearly with time. The potential across the sample was measured by a microvolt meter. The current which produced a one microvolt signal across the superconductor wire sample was taken as the critical current at the imposed field level. The critical current measured was for the imposed field perpendicular to the current in the superconductor wire. The results of the current carrying capacity tests for the above alloys are illustrated in the figure of the drawing.

It is evident from the curves set forth in the figure that the niobium-titanium alloys containing a desirable total amount of oxygen and nitrogen and from about 0.5 to about 2.0% yttrium possess considerably higher critical currents than a similar alloy containing no yttrium. For example, at an applied field of 10 kilogauss, the niobium-titanium alloy containing no yttrium has a critical current of about 19 amperes while the alloy containing 0.5% yttrium has a critical current of about 39 amperes or more than twice that of the yttrium free alloy. The alloy containing 2.0% yttrium has a critical current of about 145 amperes at an applied magnetic field of 10 kilogauss which is almost eight times that of the yttrium free alloy. At an applied field of 40 kilogauss the 0.5% yttrium alloy has a critical current of more than twice that of the yttrium free alloy while the 2.0% yttrium alloy has a critical current of more than seven times that of the yttrium free alloy.

The inclusion of interstitial elements, oxygen and nitrogen in superconducting materials markedly improve the superconducting properties thereof. Generally speaking, substantially higher critical currents and current densities are obtained with increasing amounts of such interstitial elements. It has been found that desired superconducting and physical properties are obtained when the present alloys contain from about 0.005 to about 0.05% each of oxygen and nitrogen with the sum total of the oxygen and nitrogen not exceeding about 0.1%. When the sum total of oxygen and nitrogen exceeds about 0.1%, it has been found that the alloys become appreciably more difficult to work.

The preferred alloys in the form of wire coated in the manner heretofore noted can be incorporated in a superconducting device such as a solenoid. The wire can be wound so as to form a suitable coil which is connected to an external power source such as a battery by means of leads and a switch. The coil is suspended in a low temperature environment such as liquid helium which makes the coil superconducting. Typically, the liquid helium is contained in a Dewar flask.

Whenever the expressions "percent" or "%" are used in the specification and claims, they are to be deemed to refer to weight percent.

Since certain changes may be made in the above described details without departing from the scope of the invention herein involved, it is intended that all matter contained in the description shall be interpreted as illustrative and not in a limiting sense.

What is claimed is:

1. A superconducting alloy comprising, by weight, from about 30 to about 60% titanium, about 2.0% yttrium, oxygen and nitrogen being present, the sum total of which ranging between about 0.01 and about 0.10%, and the balance niobium.

2. A superconducting alloy comprising, by weight, from about 42 to about 43.5% titanium, about 2.0% yttrium, the oxygen and nitrogen being present, the sum total of which ranging between about 0.01 and about 0.10%, and the balance niobium.

References Cited by the Examiner

UNITED STATES PATENTS

| | | | |
|---|---|---|---|
| 3,167,692 | 1/1965 | Matthias | 75—174 X |
| 3,181,946 | 5/1965 | McAndrew et al. | 75—174 |
| 3,236,638 | 2/1966 | Clark | 75—174 |

OTHER REFERENCES

Superconductors, Interscience Publishers, New York, 1962, relied on pages 68–72.

HYLAND BIZOT, *Primary Examiner.*

CHARLES N. LOVELL, *Examiner.*